United States Patent
Shamilian et al.

(10) Patent No.: US 8,497,796 B2
(45) Date of Patent: Jul. 30, 2013

(54) METHODS AND APPARATUS FOR CONTROLLING ONE OR MORE ELECTRONIC DEVICES BASED ON THE LOCATION OF A USER

(75) Inventors: John H. Shamilian, Tinton Falls, NJ (US); Thomas L. Wood, Colts Neck, NJ (US)

(73) Assignee: Alcatel Lucent, Paris (FR)

(*) Notice: Subject to any disclaimer, the term of this patent is extended or adjusted under 35 U.S.C. 154(b) by 594 days.

(21) Appl. No.: 12/358,688

(22) Filed: Jan. 23, 2009

(65) Prior Publication Data

US 2010/0188279 A1 Jul. 29, 2010

(51) Int. Cl.
*G08C 19/12* (2006.01)
*H04L 17/02* (2006.01)
*G05B 23/02* (2006.01)

(52) U.S. Cl.
USPC .............. 341/176; 340/3.71; 340/825.49

(58) Field of Classification Search
USPC .......................................... 341/176
See application file for complete search history.

(56) References Cited

U.S. PATENT DOCUMENTS

| | | | |
|---|---|---|---|
| 2006/0109112 A1* | 5/2006 | Haines | 340/539.32 |
| 2007/0171091 A1* | 7/2007 | Nisenboim et al. | 340/825.69 |
| 2009/0058595 A1* | 3/2009 | Mainguet et al. | 340/5.53 |
| 2009/0140064 A1* | 6/2009 | Schultz et al. | 236/51 |
| 2009/0169023 A1* | 7/2009 | Wang | 381/57 |

* cited by examiner

*Primary Examiner* — Dharti Patel
(74) *Attorney, Agent, or Firm* — Ryan, Mason & Lewis, LLP

(57) ABSTRACT

A method and apparatus are disclosed for controlling one or more electronic devices based on the location of a user. A remote control is configured by determining a location of a user; and automatically configuring the remote control with one or more menus that are appropriate for the location. The remote control may be, for example, a personal user interface. The user location can be determined, for example, using triangulation techniques by determining if the user is in proximity of a fixed Bluetooth device. The remote control may be automatically configured to present one or more menus for one or more of activities and a device located in the location.

28 Claims, 5 Drawing Sheets

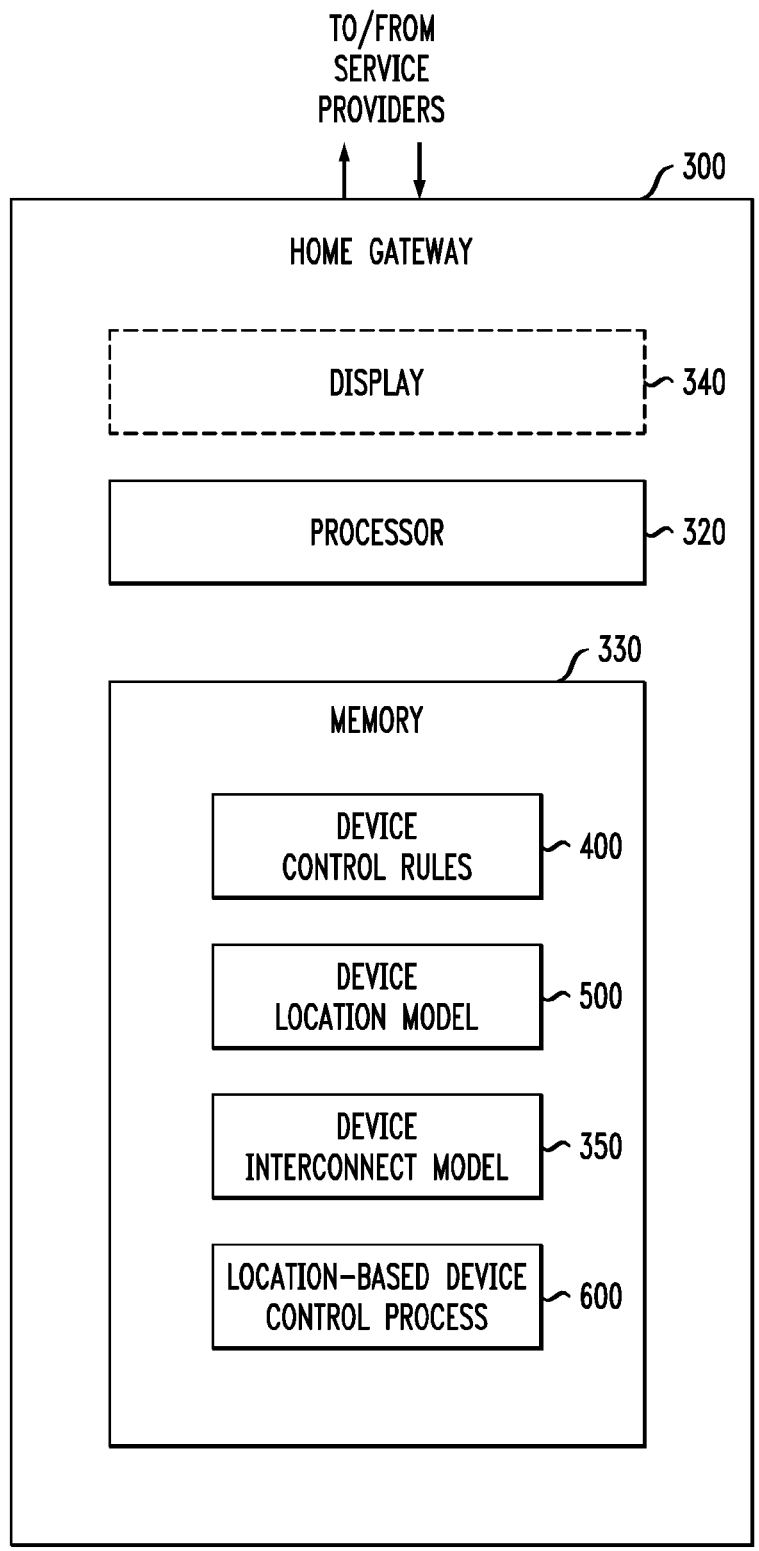

FIG. 4

DEVICE CONTROL RULES
400

| TRIGGER | ACTION |
|---|---|
| 410 — USER MOVES WITHIN PROXIMITY OF GIVEN CONTROLLED DEVICE | PRESENT MENU ON PUI FOR GIVEN CONTROLLED DEVICE |
| 420 — TV USER LEAVES ROOM 1 TO ENTER ROOM 2 | TURN OFF LIGHTS AND DEVICES IN ROOM 1; FOLLOW USER WITH TV SIGNAL FROM TV IN ROOM 1 TO PUI DISPLAY TO TV IN ROOM 2 |
| 430 — PHONE CALL ANSWERED BY USER ? | LOWER VOLUME OF (OR PAUSE) DEVICES IN PROXIMITY |
| 440 — USER ENTERS NEW ROOM | ADJUST LIGHTS OR OTHER DEVICES (SUCH AS HVAC DEVICE), BASED ON USER PREFERENCES AND TIME OF DAY |

METHODS AND APPARATUS FOR CONTROLLING ONE OR MORE ELECTRONIC DEVICES BASED ON THE LOCATION OF A USER

FIELD OF THE INVENTION

The present invention relates to remote control device for controlling one or more electronic devices and, more particularly, to remote control devices that are automatically configured based on the location of the user.

BACKGROUND OF THE INVENTION

Homes typically include a number of electronic devices, such as televisions, cable set-top boxes, stereo systems, digital video recorders (DVRs) and personal computers. Many of these electronic devices have an associated remote control that allows the user to remotely adjust a number of the device settings. For example, a remote control allows a user to activate a television and to adjust the volume, program channel and other settings of the television.

Universal remote control devices, such as those from Logitech of Fremont, Calif., have been developed that allow a user to control multiple electronic devices using a single remote control. While such universal remote control devices have greatly improved the convenience of operating multiple electronic devices, they suffer from a number of limitations, which if overcome, could further improve the convenience and utility of remote control devices. For example, a user typically must traverse through a number of menus on the universal remote control device before being able to control a desired electronic device.

A need therefore exists for a remote control device that automatically presents one or more control menus to a user based on the location of the user in the home. A further need exists for a remote control system that monitors the location of the user and automatically presents the user with the appropriate control screen on a remote control for controlling a desired electronic device.

SUMMARY OF THE INVENTION

Generally, methods and apparatus are provided for controlling one or more electronic devices based on the location of a user. According to one aspect of the invention, a remote control is configured by determining a location of a user; and automatically configuring the remote control with one or more menus that are appropriate for the location. The remote control may be, for example, a personal user interface. The user location can be determined, for example, using triangulation techniques by determining if the user is in proximity of a fixed Bluetooth device.

According to a further aspect of the invention, the remote control may be automatically configured to present one or more menus for one or more of activities and a device located in the location. The location of the device can be determined, for example, based on a device location model. In another embodiment, one or more lighting or heating/ventilation/air conditioning (HVAC) devices in the location may be configured based on one or more of user preferences, time of day and location of a plurality of users. Other optional aspects of the invention allow the volume of one or more devices in the location to be adjusted when a telephone call is answered in the location and to transfer a video signal from a television in the location to a display on the remote control.

A more complete understanding of the present invention, as well as further features and advantages of the present invention, will be obtained by reference to the following detailed description and drawings.

BRIEF DESCRIPTION OF THE DRAWINGS

FIG. 3 is a block diagram of an exemplary home gateway that can implement the processes of the present invention;

FIG. 4 illustrates an exemplary device control rule-base, in accordance with an embodiment of the present invention;

DETAILED DESCRIPTION

The present invention provides methods and apparatus for controlling one or more electronic devices based on the location of a user. According to one aspect of the invention, a remote control is provided with location based menu presentation. The present invention recognizes that users do not want to control a device. Rather, users want to participate in an activity. It has been observed that the desired activity can often be inferred by the location of the user in the home. For example, it may be observed that when a particular user sits in a particular location at a certain time of day, the user also tends to turn on the television set using the remote control. In one exemplary implementation, the present invention learns such repetitive user activity and automatically presents the user with the appropriate control screen on the remote control for controlling the desired electronic device.

Figure 1:
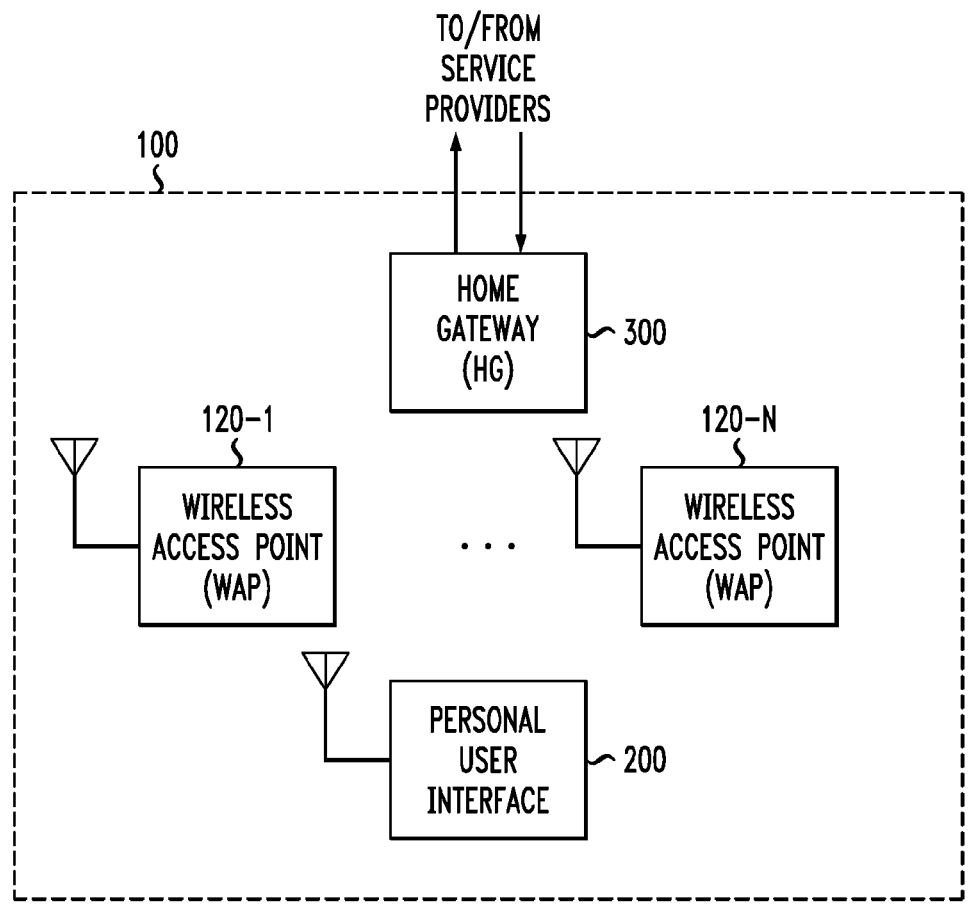
FIG. 1 illustrates a location-based device control system that incorporates features of the present invention.

FIG. 1 illustrates a location-based device control system 100 that incorporates features of the present invention. As shown in FIG. 1, the exemplary location-based device control system 100 comprises a home gateway (HG) 300, discussed further below in conjunction with FIG. 3, one or more wireless access points (WAP) 120-1 through 120-N (hereinafter, collectively referred to as wireless access points 120), and a personal user interface (PUI) 200, discussed further below in conjunction with FIG. 2. The wireless access points 120 may be implemented, for example, based on the IEEE 802.11 standard. As discussed hereinafter, the wireless access points 120, in cooperation with the personal user interface 200, can preferably track the position of the user in the home, for example, using triangulation techniques.

Figure 2:
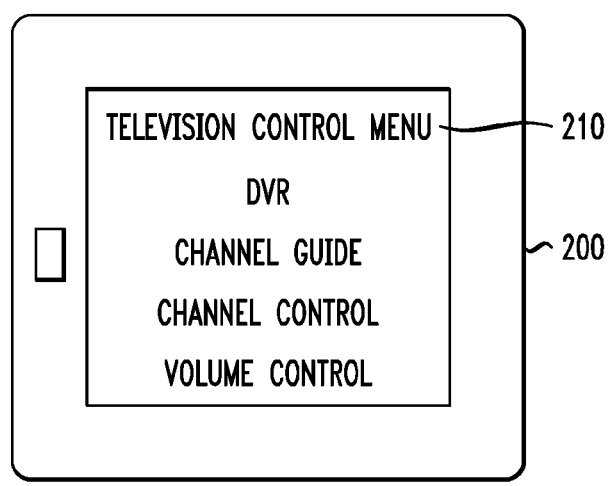
FIG. 2 illustrates an exemplary personal user interface that incorporates features of the present invention.

FIG. 2 illustrates an exemplary personal user interface 200 that incorporates features of the present invention. The personal user interface 200 may be implemented, for example, as a smart telephone, such as an iPhone, commercially available from Apple Inc. of Cupertino, Calif., as modified herein to provide the features and functions of the present invention. The personal user interface 200 may communicate with the home gateway 300, the wireless access points 120 and other electronic devices, for example, using one or more of WiFi, infrared (IR) and Bluetooth techniques.

As previously indicated, the personal user interface 200 provides a remote control function that includes location-based menu presentation. The personal user interface 200 automatically presents the user with the appropriate control screen on the remote control for controlling a desired electronic device, based on the location of the user.

As shown in FIG. 2, the exemplary personal user interlace 200 presents an illustrative control screen 210 for a user that desires to watch television. The exemplary control screen 210 allows a user to access a DVR menu, to access a channel guide or to adjust the channel or volume settings of the television. If the user selects the channel guide option, for example, the user can be presented with a program grid that allows a user to select a program to watch or record, in a known manner.

In addition, the exemplary personal user interface 200 may optionally include a global positioning system (GPS) to provide the desired location information, and an accelerometer.

FIG. 3 is a block diagram of an exemplary home gateway 300 that can implement the processes of the present invention. As shown in FIG. 3, memory 330 configures the processor 320 to implement the device control methods, steps, and functions disclosed herein. The memory 330 could be distributed or local and the processor 320 could be distributed or singular. The memory 330 could be implemented as an electrical, magnetic or optical memory, or any combination of these or other types of storage devices. It should be noted that each distributed processor that makes up processor 320 generally contains its own addressable memory space. It should also be noted that some or all of computer system 300 can be incorporated into a personal computer, laptop computer, handheld computing device, application-specific circuit or general-use integrated circuit. The home gateway 300 optionally includes a display 340 and one or more connections to and/or from service provides, such as a Voice Over IP (VoIP) service provider or another telephone service provider.

In addition, as shown in FIG. 3, the exemplary memory 330 includes device control rules 400, discussed further below in conjunction with FIG. 4, a device location model 500, discussed further below in conjunction with FIG. 5, a device interconnect model 350 and a location-based device control process 600, discussed below in conjunction with FIG. 6.

Generally, the device interconnect model 350 maps the various device interconnections in a known manner. For example, the exemplary device interconnect model 350 may specify that the television signal is applied to an AV1 input on the receiver.

The home gateway 300 is a residential gateway accessible by one or more service providers and a home owner. The home gateway 300 can store applications loadable by the service provider and that are customized by the home owner.

FIG. 4 illustrates an exemplary device control rule-base 400, in accordance with an embodiment of the present invention. In one exemplary implementation, shown in FIG. 4, the present invention employs a rule-base to define a particular configuration for the remote control based on a predefined location of a given user.

As shown in FIG. 4, the exemplary device control rule-base 400 includes one or more rules 410, 420, 430, 440 that may be employed to automatically configure the personal user interface 200 and other devices based on user-location, if a given rule is satisfied. Each exemplary rule 410, 420, 430, 440 comprises a trigger defining one or more conditions that must be present in order for the rule to be satisfied, as well as a corresponding action to be performed whenever the rule is satisfied.

For example, the trigger condition for rule 410 requires that the user must move within a defined proximity of a given controlled device. When rule 410 is satisfied, the user will be automatically presented with a menu 210 on the personal user interface 200 for controlling the indicated device(s). In this manner, if a user moves into proximity of a particular device, such as a television, the personal user interface 200 is automatically configured with the appropriate menu(s) and other settings to control the particular device.

Likewise, the trigger condition for rule 420 requires that a television user leaves a first room to enter a second room. When rule 420 is satisfied, the home gateway 300 will automatically turn off the lights and devices in the first room and follow the user with the television signal (or another media signal) from the television (or another media device) in the first room to the display (or audio speaker) on the personal user interface 200 to the television (or another media device) in the second room.

Similarly, the trigger condition for rule 430 requires that a telephone call is answered by a user. When rule 430 is satisfied, the home gateway 300 will automatically lower the volume of (or pause) any devices in proximity to the answered telephone. In this manner, the experience for multiple users can be globally optimized. Likewise, the trigger condition for rule 440 requires that a user enters a new room. When rule 440 is satisfied, the home gateway 300 will turn on the appropriate lights, based on user preferences and the time of day.

It is noted that the user can specify the rules included in the device control rule-base 400, or they can be learned by the location-based device control system 100 (or a combination thereof). For example, artificial intelligence techniques can be employed to derive one or more rules from user behavior and patterns. In this manner, the location-based device control system 100 can learn the preferences of one or more users. For example, the location-based device control system 100 may observe that a particular user typically watches television when sitting on a certain piece of furniture.

Figure 5:
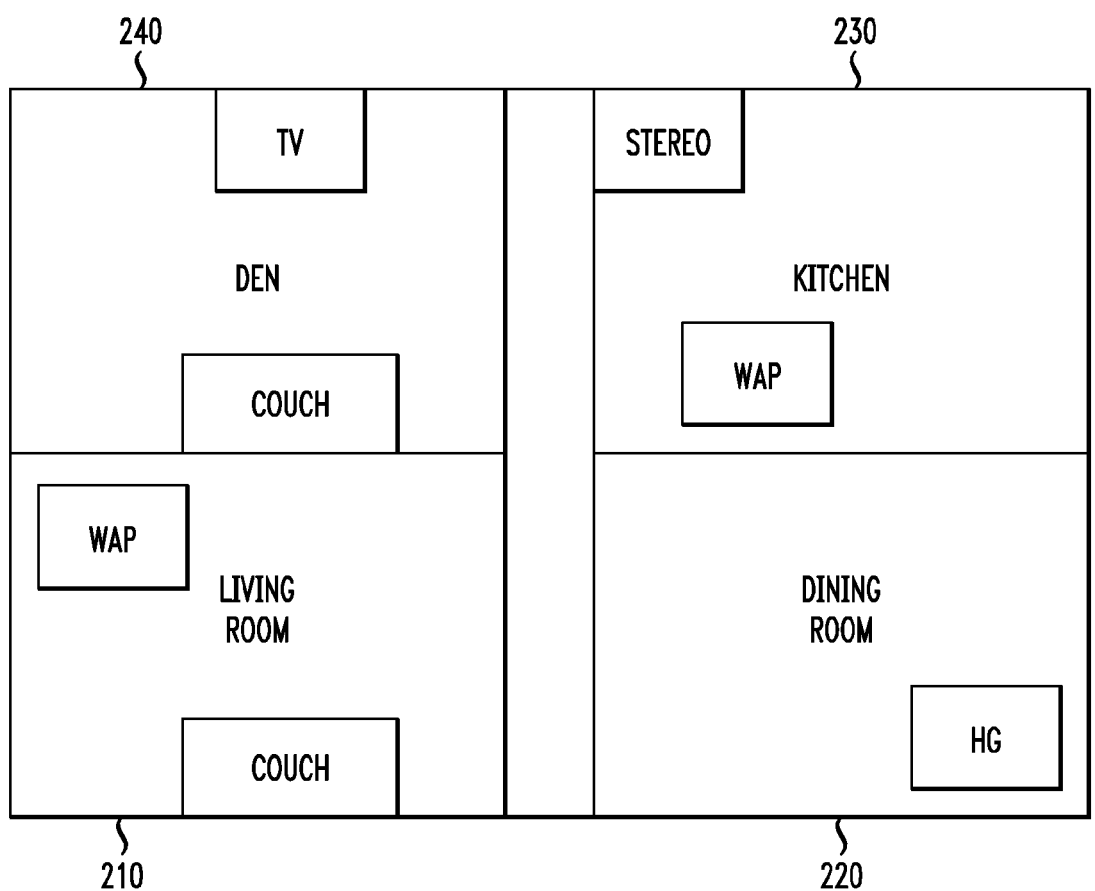
FIG. 5 illustrates an exemplary device location model incorporating features of the present invention.

FIG. 5 illustrates an exemplary device location model 500 incorporating features of the present invention. As shown in FIG. 5, the device location model 500 provides a map of the house and the various devices contained in each area. For example, as shown in FIG. 5, the exemplary device location model 500 indicates that the den 240 includes a television and a couch and maps their relative positions.

Figure 6:
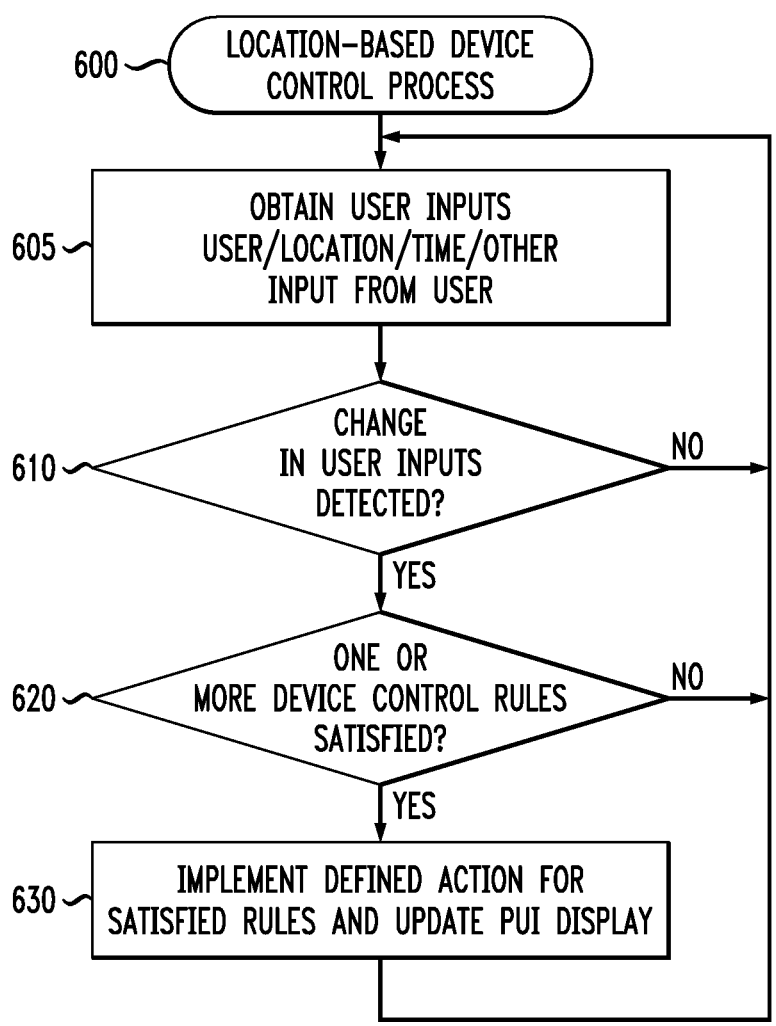
FIG. 6 is a flow chart describing an exemplary implementation of a location-based device control process.

FIG. 6 is a flow chart describing an exemplary implementation of a location-based device control process 600. As shown in FIG. 6, the visual recommendation process 600 initially obtains any user input, such as a user identifier, user location and date/time, as well as any additional inputs from the user. Thereafter, the visual recommendation process 600 performs a test during step 610 to determine if a change in user inputs is detected. If it is determined during step 610 that a change in user inputs is not detected, then the process 600 continues to monitor the home until a new user position detected. As previously indicated, the user position can be detected within the home, for example, using triangulation techniques using an extension of WiFi (IEEE 802.11) or by detecting if the user is in proximity of a fixed bluetooth device.

Once it is determined during step 610 that a change in user inputs is detected, then a further test is performed during step 620 to determine if one or more device control rules in the device control rule-base 400 are satisfied. If it is determined during step 620 that the new position does not satisfy one or more rules, then program control returns to step 610.

If, however, it is determined during step 620 that one or more device control rules in the device control rule-base 400 are satisfied, then the defined action(s) for the satisfied rule(s) are implemented during step 630. The display of the personal user interface 200 can also be optionally updated during step 630.

It is noted that the visual recommendation process 600 is applicable outside of the home utilizing, for example, a GPS to obtain the position of the user and a data network, such as a 3G data network and a WiFi hotspot for transmission of data to the personal user interface 200 from the home gateway 300 or anther controlling device, as would be apparent to a person of ordinary skill.

EXAMPLES

Assume that a home owner walks into the living room and sits on the couch. According to one aspect of the invention, the personal user interface 200 automatically offers a list of Activities for this location (such as television, Music, Reading, and Internet). The home owner selects television and the personal user interface 200 offers a list of preferred channels and previously recorded programs. The home owner selects a particular movie, and the home gateway 300 turns on the television, selects the proper HDM1 input and the selected movie starts playing on the television.

The personal user interface 200 presents a progress slider bar and volume controls. If a child of the home owner walks into the room, the movie can be automatically paused and the television screen changes to a generic screen saver. The personal user interface 200 of the child shows a list of television listings appropriate for his or her age, and his or her previously recorded programs. The child talks to the home owner and then leaves the room.

The personal user interface 200 of the home owner offers a "Resume Movie" function and list of Activities for this location (TV, Music, Reading, and Internet). The home owner then selects "listen to Music." The television turns off and the personal user interface 200 offers a menu of saved playlist songs that the home owner has made and also new suggestions that he or she may like. The home owner selects a desired song and the stereo turns on streaming the selected song. The personal user interface 200 displays the song title, progress slider bar and volume control.

The home gateway 300 tracks the location of the users through the use of RF in the personal user interface 200 of each user. The home gateway 300 distinguishes among users and offers his or her favorite activities for this location. For example, the presented TV listings differ from others in the home base on his or her preferences and age appropriateness. The home gateway 300 also configures the video port selection via guided learning of equipment in room. The home gateway 300 can pause screen during a movie and change the TV based on the presence of an inappropriate rating for a child in the room. The resume function remembers book marks for each user.

In a further example, a user is in the kitchen, when her PUI rings. Only the PUI of this user rings, because the callerID identifies the caller is only in this user's contacts. The music of another user in the next room is automatically lowered, so as not to interfere with the call of the first user. The first user steps out onto the deck for some privacy and the kitchen lights are lowered to conserve energy. The music volume level of the second user is slowly increased to its previous level.

CONCLUSION

While FIG. 6 shows an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may also be implemented in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

SYSTEM AND ARTICLE OF MANUFACTURE DETAILS

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for configuring a remote control, comprising:
   obtaining a user identity associated with a given user of said remote control;
   determining a location of said remote control;
   automatically configuring said remote control with one or more user-specific menus based on said user identity and a controlled device located in said location; and
   automatically configuring one or more devices located in said location without user intervention based on one or more of said user identity and an identity of another person located in said location.

2. The method of claim 1, wherein said remote control is a personal user interface.

3. The method of claim 1, wherein said determining step employs triangulation techniques.

4. The method of claim 1, wherein said determining step determines if said user is in proximity of a fixed Bluetooth device.

5. The method of claim 1, wherein said automatically configuring step further comprises the step of presenting one or more menus for one or more of activities and a device located in said location.

6. The method of claim 5, wherein said device located in said location is determined based on a device location model.

7. The method of claim 1, further comprising the step of configuring one or more lighting devices in said location based on one or more of user preferences, time of day and location of a plurality of users.

8. The method of claim 1, further comprising the step of configuring one or more heating/ventilation/air conditioning (HVAC) devices in said location based on one or more of user preferences of said given user and location of said given user.

9. The method of claim 1, further comprising the step of adjusting the volume of one or more devices in said location when a telephone call is answered in said location.

10. The method of claim 1, further comprising the step of transferring a media signal from a first device in said location to a media player on said remote control.

11. The method of claim 1, further comprising the step of automatically controlling one or more devices in said location based on a proximity of at least one user.

12. The method of claim 1, further comprising the step of automatically learning one or more of user preferences for one or more devices in said location.

13. The method of claim 1, further comprising the step of adjusting a sensory output of one or more devices in said location that interferes with use of a device by said given user.

14. An apparatus for configuring a remote control, comprising:
   a memory; and
   at least one processor, coupled to the memory, operative to:
   obtain a user identity associated with a given user of said remote control;
   determine a location of said remote control;
   automatically configure said remote control with one or more user-specific menus based on said user identity and a controlled device located in said location and
   automatically configure one or more devices located in said location without user intervention based on one or more of said user identity and an identity of another person located in said location.

15. The apparatus of claim 14, wherein said remote control is a personal user interface.

16. The apparatus of claim 14, wherein said location of a user is determined using triangulation techniques.

17. The apparatus of claim 14, wherein said location of a user is determined based on whether said user is in proximity of a fixed Bluetooth device.

18. The apparatus of claim 14, wherein said remote control is automatically configured to present one or more menus for one or more of activities and a device located in said location.

19. The apparatus of claim 18, wherein said device located in said location is determined based on a device location model.

20. The apparatus of claim 14, wherein said processor is further operative to configure one or more lighting devices in said location based on one or more of user preferences, time of day and location of a plurality of users.

21. The apparatus of claim 14, wherein said processor is further operative to adjust the volume of one or more devices in said location when a telephone call is answered in said location.

22. The apparatus of claim 14, wherein said processor is further operative to transfer a media signal from a first electronic device in said location to a media player on said remote control.

23. The apparatus of claim 14, wherein said processor is further configured to automatically control one or more devices in said location based on a proximity of at least one user.

24. The apparatus of claim 14, wherein said processor is further configured to automatically learn one or more of user preferences for one or more devices in said location.

25. The apparatus of claim 14, wherein said processor is further configured to adjust a sensory output of one or more devices in said location that interferes with use of a device by said given user.

26. An article of manufacture for configuring a remote control, comprising a tangible machine readable storage medium containing one or more programs which when executed implement the steps of:
   obtaining a user identity associated with a given user of said remote control;
   determining a location of said remote control;
   automatically configuring said remote control with one or more user-specific menus based on said user identity and a controlled device located in said location and
   automatically configure one or more devices located in said location without user intervention based on one or more of said user identity and an identity of another person located in said location.

27. An apparatus for configuring a remote control, comprising:
   a memory; and
   at least one processor, coupled to the memory, operative to:
   obtain a user identity associated with a given user of said remote control;
   determine a location of said remote control; and
   automatically configure said remote control with one or more user-specific menus based on said user identity and a controlled device located in said location, wherein said of automatic configuration of said remote control with one or more user-specific menus is further based on a second user identity, the second user identity associated with a second given user of a second remote control, wherein said second remote control is within a predefined proximity to said location.

28. A method for configuring a remote control, comprising:
   obtaining a user identity associated with a given user of said remote control;

determining a location of said remote control; and
automatically configuring said remote control with one or more user-specific menus based on said user identity and a controlled device located in said location, wherein said step of automatically configuring said remote control with one or more user-specific menus is further based on a second user identity, the second user identity associated with a second given user of a second remote control, wherein said second remote control is within a predefined proximity to said location.

* * * * *